(12) United States Patent
Ozawa

(10) Patent No.: US 11,133,988 B2
(45) Date of Patent: Sep. 28, 2021

(54) WIRELESS ACCESS NETWORK DEVICE, VERSION MANAGEMENT SYSTEM, VERSION MANAGEMENT METHOD, AND PROGRAM

(71) Applicant: NEC Corporation, Tokyo (JP)

(72) Inventor: Hirokazu Ozawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/875,278

(22) Filed: May 15, 2020

(65) Prior Publication Data
US 2020/0374184 A1   Nov. 26, 2020

(30) Foreign Application Priority Data

May 20, 2019   (JP) .............................. JP2019-094631

(51) Int. Cl.
*G06F 15/177*   (2006.01)
*H04L 12/24*   (2006.01)

(52) U.S. Cl.
CPC ........ *H04L 41/082* (2013.01); *H04L 41/0846* (2013.01); *H04L 41/0859* (2013.01); *H04L 41/0866* (2013.01)

(58) Field of Classification Search
CPC ............... H04L 41/082; H04L 41/0846; H04L 41/0866; H04L 41/0859
See application file for complete search history.

(56) References Cited

U.S. PATENT DOCUMENTS

| | | | |
|---|---|---|---|
| 2002/0188934 A1* | 12/2002 | Griffioen .................. | G06F 8/65 717/170 |
| 2008/0028046 A1* | 1/2008 | Ushiki ..................... | H04L 67/34 709/219 |
| 2013/0210359 A1* | 8/2013 | Kwon .................... | H04W 48/16 455/41.2 |
| 2014/0123123 A1* | 5/2014 | Bahls ........................ | G06F 8/65 717/170 |
| 2017/0344594 A1* | 11/2017 | Lindem, III .......... | G06F 16/275 |
| 2018/0063700 A1* | 3/2018 | Chandrasekaran ..... | H04L 67/14 |
| 2019/0303126 A1* | 10/2019 | Juven ........................ | G06F 8/65 |
| 2020/0021485 A1* | 1/2020 | Pillai ..................... | H04L 9/3271 |

FOREIGN PATENT DOCUMENTS

JP    60-252952 A    12/1985

\* cited by examiner

*Primary Examiner* — Richard G Keehn
(74) *Attorney, Agent, or Firm* — Sughrue Mion, PLLC

(57) ABSTRACT

A wireless access network device includes controlling means that controls communication and storing means that stores first table information that includes version information of each object. The controlling means includes difference detecting means for comparing the first table information in the storing means and second table information that is stored in a load module of the controlling means and for detecting a difference between the first table information and the second table information, the second table information including version information of the each object that is to have its version updated, and acquiring means for acquiring an update file for an object that is to have its version updated from another adjacent wireless access network device when the difference detecting means has detected the difference.

4 Claims, 7 Drawing Sheets

WIRELESS ACCESS NETWORK DEVICE, VERSION MANAGEMENT SYSTEM, VERSION MANAGEMENT METHOD, AND PROGRAM

INCORPORATION BY REFERENCE

This application is based upon and claims the benefit of priority from Japanese patent application No. 2019-094631, filed on May 20, 2019, the disclosure of which is incorporated herein in its entirety by reference.

TECHNICAL FIELD

The present disclosure relates to a wireless access network device, a version management system, a version management method, and a program that manage versions.

BACKGROUND ART

A communication network is formed by a plurality of interconnected wireless access network devices. In a communication network, software in each wireless access network device is updated (see, for example, Japanese Unexamined Patent Application Publication No. 60-252952). Such a communication network where wireless access network devices are used has the following issues concerning version update.

(1) Complexity of Version Management within Wireless Access Network Device

In order to manage functions implemented by hardware (field-programmable gate array (FPGA), version number of interface (IF) card), embedded software (ESW), and so on, combinations of objects that can have their versions updated need to be managed.

As a background, a wireless access network device of a universal slot configuration is provided with a plurality of types of IF cards to provide a variety of services. The IF cards, however, differ in their configuration parameters of FPGA_ROM and wireless functions or in their HW versions, and the wireless access network device includes a number of objects that are to have their versions updated. In the wireless access network device, not only the IF cards but also an outdoor unit (ODU) needs to be managed in a similar manner. In a client environment, a malfunctioning IF card may be replaced with a stocked IF card with an old FPGA version. In this case, a network management system (NMS) needs to update files in the wireless access network device.

(2) Failure to Support Function Due to Version Mismatch between Wireless Access Network Devices When opposing wireless access network devices are to be connected wirelessly or via a wired network, such as Ethernet, their supported functions cannot be enabled unless they are of the same or later versions. For example, when supported wireless bands differ in different versions of a load module (LM) or when an added function is supported only in a certain LM version or higher, the versions of the opposing wireless access network devices need to match each other.

(3) Increase in Use of Network Band

An NMS performs version update on (each object in) each wireless access network device within a network. Therefore, the version update requires a large amount of time when there are many wireless access network devices within the same network. Furthermore, since the network band is used in point-to-point from the NMS to each wireless access network device within the network, an increase in the hop count to a download destination leads to an increase in the consumed band.

In one method of managing the entire versions within a wireless access network device, the versions are updated at once through a bundle file or the like. However, with an increase in the types of objects that are to have their versions updated, a larger number of unnecessary files, such as an object file for an unmounted IF card, arise in a certain wireless access network device, and this leads to an increase in the size of the bundle file. This poses a problem in that downloading from the NMS to the wireless access network device consumes the network band or in that the memory capacity within the wireless access network device is consumed for temporary storage.

SUMMARY

The present disclose is directed to providing a wireless access network device, a version management system, a version management method, and a program that overcome any of the above-described issues.

To this end, one aspect provides a wireless access network device that includes:
controlling means for controlling communication; and
storing means for storing first table information that includes version information of each object, wherein
the controlling means includes
difference detecting means for comparing the first table information in the storing means and second table information that is stored in a load module of the controlling means and for detecting a difference between the first table information and the second table information, the second table information including version information of the each object that is to have its version updated, and
acquiring means for acquiring an update file for an object that is to have its version updated from another adjacent wireless access network device when the difference detecting means has detected the difference.

Another aspect may provide a version management method for a wireless access network device that includes controlling means for controlling communication and storing means for storing first table information that includes version information of each object, and the version management method includes:
a step, performed by the controlling means, of comparing the first table information in the storing means and second table information that is stored in a load module of the controlling means and detecting a difference between the first table information and the second table information, the second table information including version information of the each object that is to have its version updated; and
a step of acquiring an update file for an object that is to have its version updated from another adjacent wireless access network device in response to detecting the difference.

Yet another aspect may provide a program for a wireless access network device that includes controlling means for controlling communication and storing means for storing first table information that includes version information of each object, and the program causes a computer to execute:
a process of comparing the first table information in the storing means and second table information that is stored in a load module of the controlling means and detecting a difference between the first table information and the second table information, the second table information including version information of the each object that is to have its version updated; and a process of acquiring an update file for an object that is to have its version updated from another adjacent wireless access network device in response to detecting the difference.

BRIEF DESCRIPTION OF DRAWINGS

The above and other aspects, features, and advantages of the present disclosure will become more apparent from the following description of certain exemplary embodiments when taken in conjunction with the accompanying drawings, in which.

EMBODIMENTS

Figure 1:
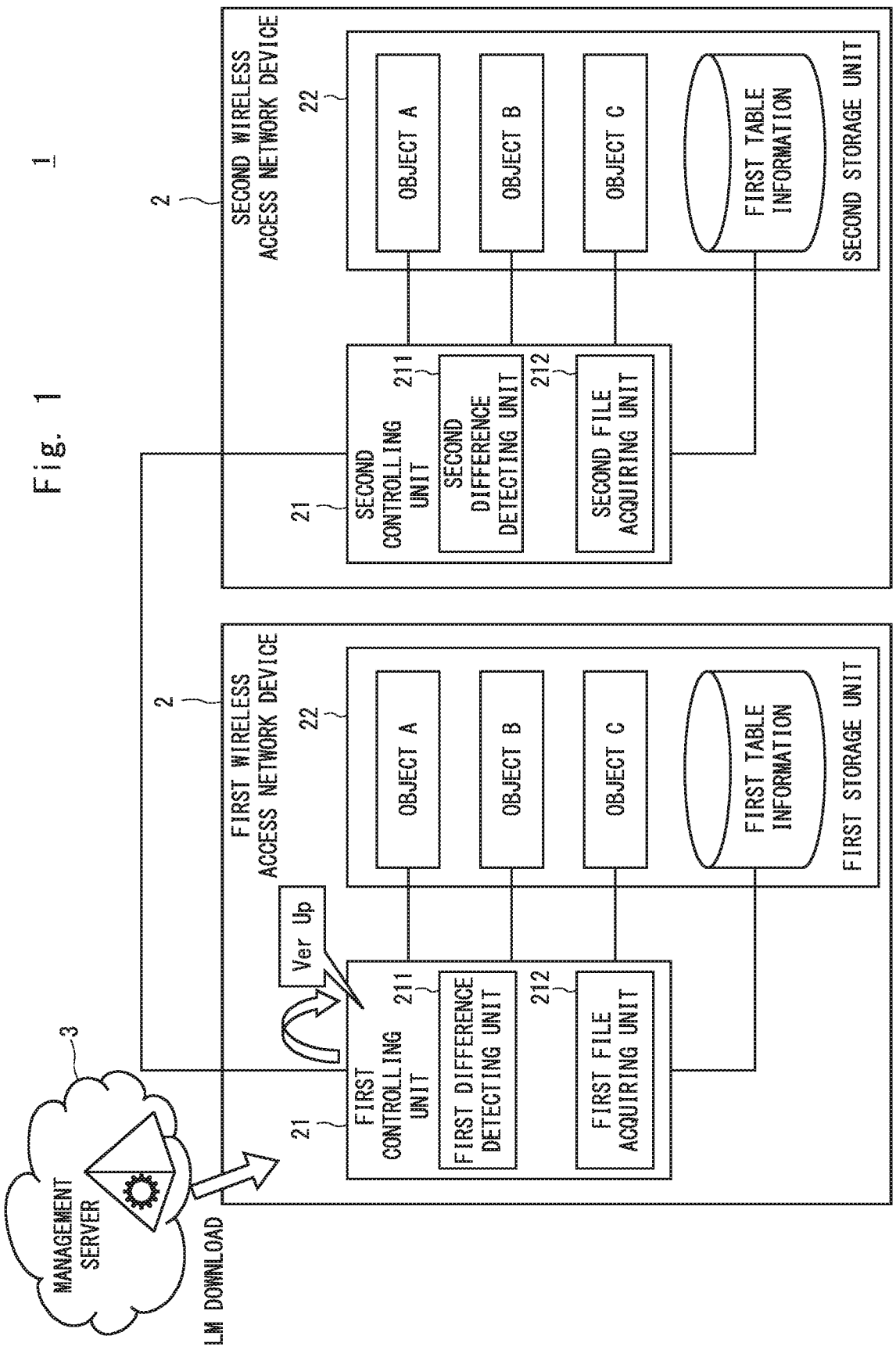
FIG. 1 is a block diagram illustrating a schematic configuration of a version management system according to an example embodiment of the present disclosure.

Hereinafter, example embodiments of the present disclosure will be described with reference to the drawings. FIG. 1 is a block diagram illustrating a schematic configuration of a version management system according to an example embodiment of the present disclosure. A version management system 1 according to the present example embodiment includes a first wireless access network device 2, a second wireless access network device 2 that is adjacent and connected to the first wireless access network device 2, and a management server 3 that manages the first and second wireless access network devices 2.

In the example illustrated in FIG. 1, the first and second wireless access network devices 2 are connected, but the configuration is not limited thereto. A plurality of wireless access network devices 2 including the first and second wireless access network devices 2 may be connected in a ring configuration or in a net configuration.

The first wireless access network device 2 includes a first controlling unit 21 and a first storage unit 22.

The first controlling unit 21 is a specific example of controlling means. The first controlling unit 21 includes, for example, a central processing unit (CPU). The first controlling unit 21 performs various types of communication control and so on.

The first storage unit 22 is a specific example of storing means. The first storage unit 22 stores, for example, version management targets and first table information for managing the version of each version management target.

The first table information is, for example, information that pertains to the version of each object serving as a version management target and that is for managing the version of each object. The version management targets include, for example, a first object A, a second object B, and a third object C. FIG. 1 illustrates a configuration in which the version management targets include three objects, but the version management targets may include any number of objects.

Examples of an object serving as a version management target include read-only memory (ROM) data of an FPGA, a load module (LM) for a sub-CPU mounted on an interface (IF) card, and embedded software (ESW) in an outdoor unit (ODU).

The first controlling unit 21 includes a first difference detecting unit 211 and a first file acquiring unit 212.

The first difference detecting unit 211 is a specific example of difference detecting means. The first difference detecting unit 211 compares the first table information in the first storage unit 22 and second table information that is stored in a load module of the first controlling unit 21. The second table information includes version information of each object to have its version updated. The first difference detecting unit 211 detects a difference between the first table information and the second table information.

The first file acquiring unit 212 is a specific example of acquiring means. When the first difference detecting unit 211 has detected a difference, the first file acquiring unit 212 acquires, from the adjacent second wireless access network device 2, an update file for an object that is to have its version updated.

The second wireless access network device 2 has a configuration similar to that of the first wireless access network device 2. The second wireless access network device 2 includes a second controlling unit 21 and a second storage unit 22.

The second controlling unit 21 is a specific example of controlling means. The second controlling unit 21 includes, for example, a CPU. The second controlling unit 21 performs various types of communication control and so on. The second storage unit 22 is a specific example of storing means. The second storage unit 22 stores, for example, first table information and information on version management targets.

The second controlling unit 21 includes a second difference detecting unit 211 and a second file acquiring unit 212.

The second difference detecting unit 211 is a specific example of difference detecting means. The second difference detecting unit 211 compares the first table information in the second storage unit 22 and second table information that is stored in a load module of the second controlling unit 21. The second table information include version information of each object that is to have its version updated. The second difference detecting unit 211 detects a difference between the first table information and the second table information.

The second file acquiring unit 212 is a specific example of acquiring means. When the second difference detecting unit 211 has detected a difference, the second file acquiring unit 212 acquires, from the adjacent first wireless access network device 2, an update file for an object that is to have its version updated.

The management server 3 is configured as a network management system (NMS) that manages a network.

The first or second wireless access network device 2 has a universal slot configuration. Therefore, when a wireless access network device 2 is installed at an exchange, the version of a load module for the controlling unit 21 needs to be updated to provide a new function or to fix a problem, for example.

The management server 3 instructs the first or second wireless access network device 2 to update the load module for the first or second controlling unit 21. The management server 3 transmits a load module for an update to the first or second wireless access network device 2. The first or second controlling unit 21 of the first or second wireless access network device 2 updates the version of its load module in accordance with the load module transmitted from the management server 3.

As described above, a wireless access network device having a universal slot configuration includes a number of objects that need to have their versions managed. For example, when the version of a load module has been updated, the versions of the objects such as the ROM data of the FPGA and the LM for the CPU on the IF card need to be updated as well. This requires a lot of work and cost for managing the versions not only within a wireless access network device but also between wireless access network devices.

Figure 2:
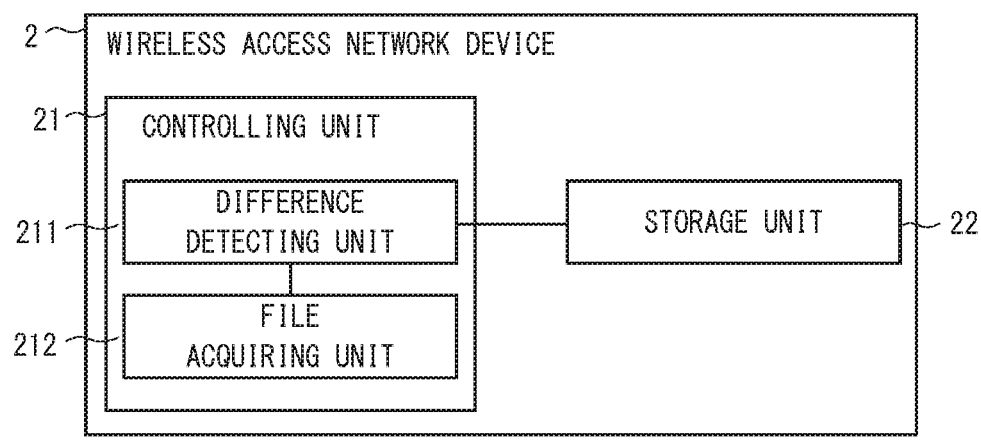
FIG. 2 is a block diagram illustrating a schematic configuration of a wireless access network device according to an example embodiment of the present disclosure.

In this respect, as illustrated in FIG. 2, a wireless access network device 2 according to the present example embodiment includes a controlling unit 21 that controls communication and a storage unit 22 that stores first table information that includes version information of each object. The controlling unit 21 includes a difference detecting unit 211 and a file acquiring unit 212. The difference detecting unit 211 compares the first table information in the storage unit 22 and second table information that is stored in a load module and that includes version information of each object. The difference detecting unit 211 detects a difference between the first table information and the second table information. The file acquiring unit 212 acquires an update file for an object that is to have its version updated from another adjacent wireless access network device 2 when the difference detecting unit has detected a difference.

Thus, a difference between the second table information indicating the latest version in the load module and the first table information indicating the current version of the object in the storage unit 22 is detected. Then, when the difference between the first table information and the second table information has been detected, an update file for the object that is to have its version updated is acquired from another adjacent wireless access network device 2, and the version is updated. In this manner, through the repeated file exchange with adjacent wireless access network devices 2, the adjacent wireless access network devices 2 can autonomously update the versions upon the latest version having been applied merely to one node within the network. Consequently, all the wireless access network devices 2 within the network are updated to the latest version.

Accordingly, not only the version of the load module but also the version of each object can be updated. Furthermore, the versions can be updated not only within each wireless access network device 2 but also between the wireless access network devices 2. This can greatly reduce the work and cost of version management.

Since the versions can be updated reliably between the wireless access network devices 2 as well as within each wireless access network device 2, any failure to support a function due to version mismatch between the wireless access network devices 2 and/or within a wireless access network device 2 can be avoided.

Furthermore, when the versions are updated in each wireless access network device 2, no network band is used in point-to-point from the management server 3 to each wireless access network device 2 within the network. This makes it possible to reduce the consumption of the network band to be used when the versions are updated.

Figure 3:
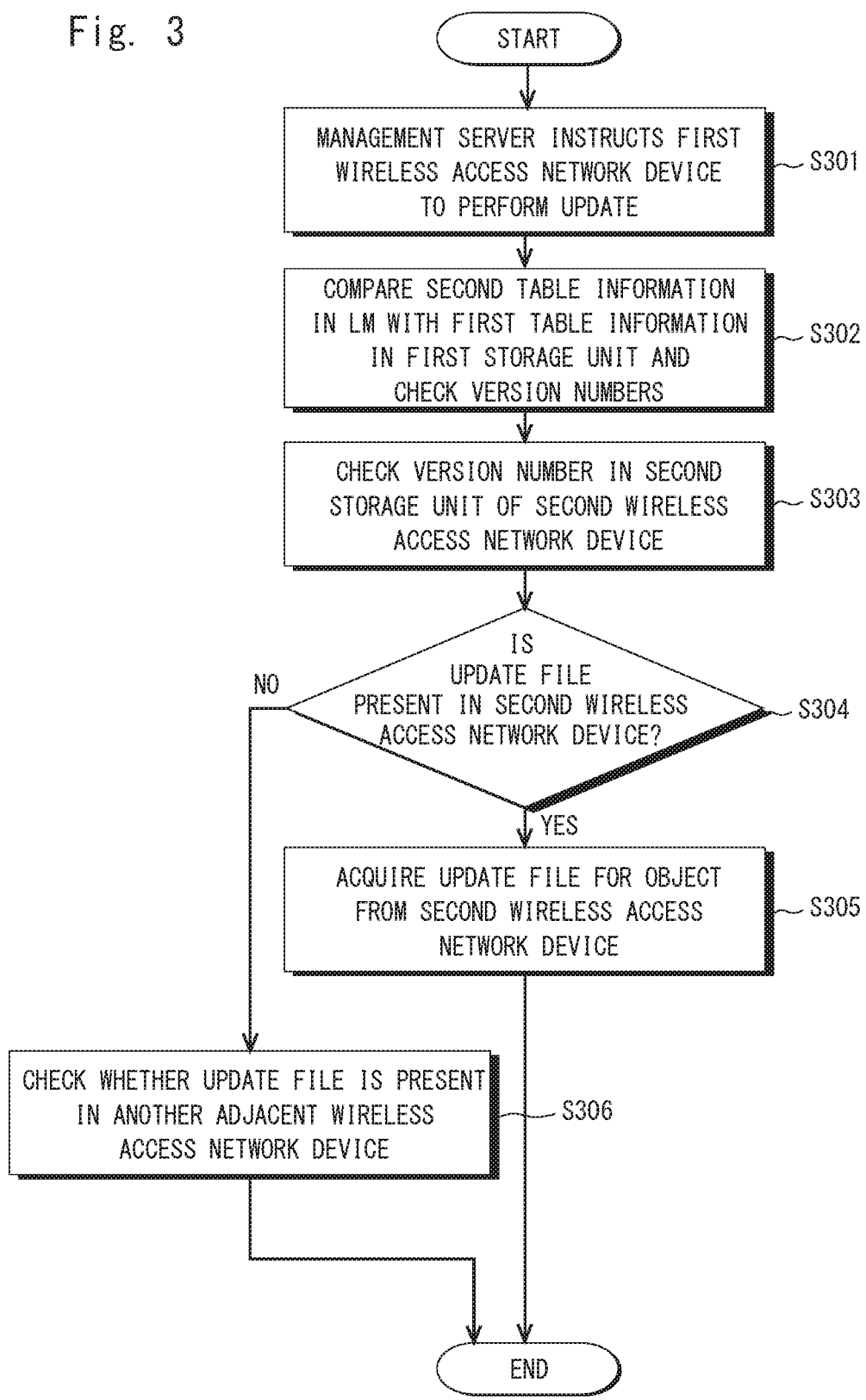
FIG. 3 is a flowchart illustrating a flow of a version management method performed by wireless access network devices.
Figure 4:
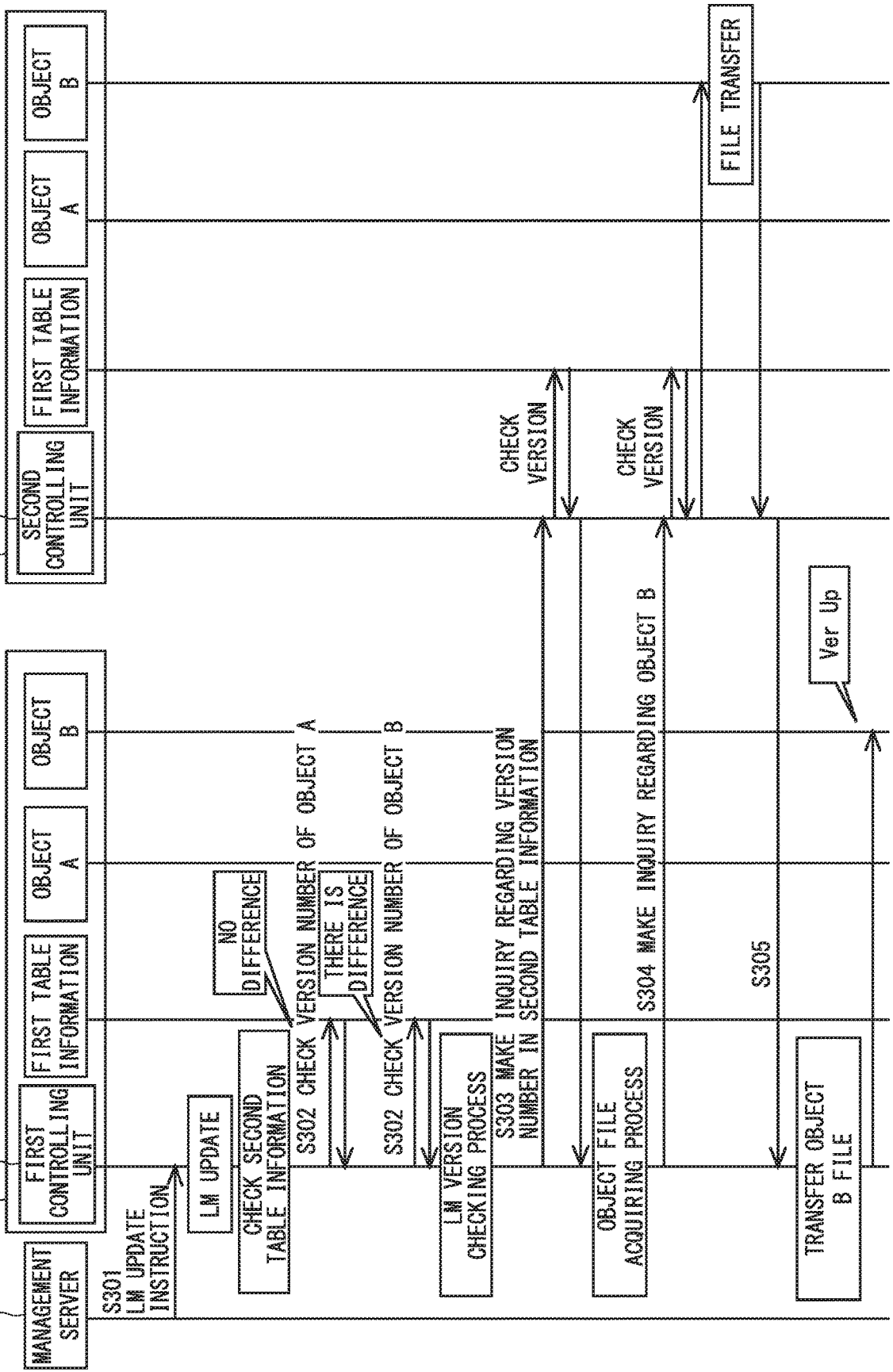
FIG. 4 is a sequence diagram of a version management method.

FIG. 3 is a flowchart illustrating a flow of a version management method performed by the wireless access network devices described above. FIG. 4 is a sequence diagram of the version management method. It is assumed that the first and second storage units 22 each store an object A and an object B that are to be updated, for example.

For example, the management server 3 transmits an update instruction signal to the first wireless access network device 2 (step S301). In response to the update instruction signal from the management server 3, the first wireless access network device 2 downloads a load module that is to have its version updated from the management server 3 and executes file update.

The first difference detecting unit 211 of the first wireless access network device 2 compares second table information stored in the load module (LM) and the first table information in the first storage unit 22 and checks the version numbers of the two (step S302). In FIG. 4, the first difference detecting unit 211 does not detect any difference between the version numbers of the object A but detects a difference between the version numbers of the object B.

When the first difference detecting unit 211 detects no difference between the first table information and the second table information, the process is terminated. Meanwhile, when the first difference detecting unit 211 has detected a difference between the first table information and the second table information, the first file acquiring unit 212 makes an inquiry as to the version (version number) in the first table information in the second storage unit 22 of the adjacent second wireless access network device 2 (step S303).

The first file acquiring unit 212 determines whether an update file for an object that is to have its version updated is present in the second storage unit 22 of the second storage unit 22 on the basis of the version in the first table information in the second storage unit 22 of the second wireless access network device 2 (step S304). In FIG. 4, since the first difference detecting unit 211 has detected a difference between the version numbers of the object B, the first file acquiring unit 212 makes an inquiry as to whether an update file for the object B is present.

In response to determining that an update file for the object that is to have its version updated is present (YES in step S304), the first file acquiring unit 212 acquires the update file for this object from the second wireless access network device 2 (step S305). In FIG. 4, the first file acquiring unit 212 acquires the update file for the object B from the second wireless access network device 2. The first file acquiring unit 212 updates the versions of the objects A and B in accordance with the acquired update file, and the process is terminated.

Meanwhile, in response to determining that no update file for the object that is to have its version updated is present (NO in step S304), the first file acquiring unit 212 makes an inquiry as to whether the update file for the object that is to have its version updated is present in another adjacent wireless access network device 2 (step S306). The first file acquiring unit 212 repeats this process until the first file acquiring unit 212 locates the update file for the object that is to have its version updated.

Figure 5:
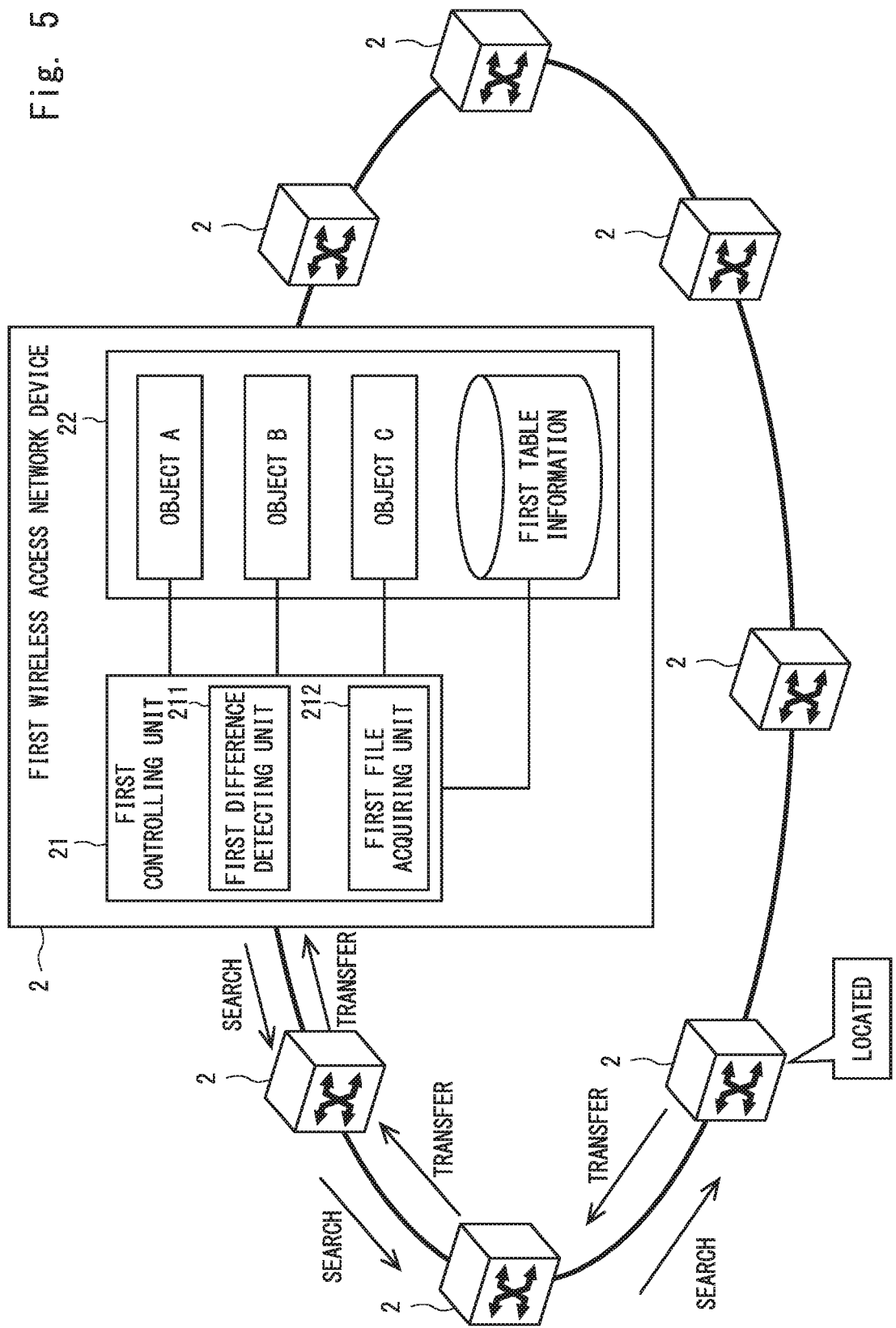
FIG. 5 illustrates a method of updating a version when a first wireless access network device with an object of an old version mounted therein is installed in a network.

FIG. 5 illustrates a method of updating a version when the first wireless access network device 2 with an object of an old version mounted therein is installed in a network. In FIG.

5, a plurality of wireless access network devices 2 are connected in a ring configuration, for example.

The wireless access network device 2 updates the version of an object in accordance with the flow illustrated in FIG. 3 described above. Then, through the repeated file exchange with adjacent wireless access network devices 2, each wireless access network device 2 updates the version successively. Consequently, all the wireless access network devices 2 within the network are updated to the latest version.

Figure 6:
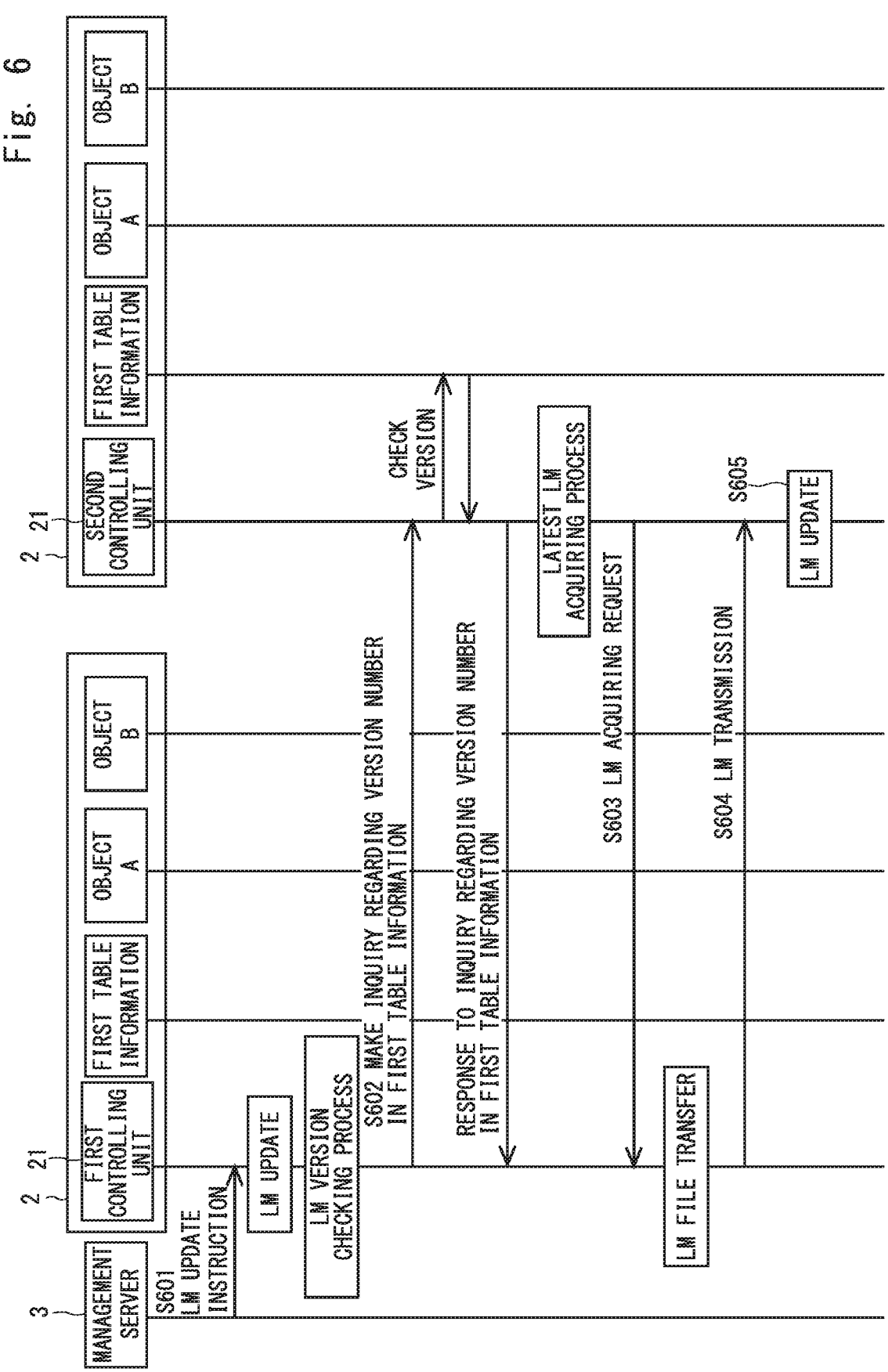
FIG. 6 is a sequence diagram of a version management method.

In the case described next, when the version of a load module in the first wireless access network device 2 is newer than the version of a load module in the second wireless access network device 2, the second wireless access network device 2 automatically updates the version of the load module. FIG. 6 is a sequence diagram of this version management method.

The management server 3 transmits an update instruction signal to the first wireless access network device 2 (step S601). In response to the update instruction signal from the management server 3, the first wireless access network device 2 downloads a load module that is to have its version updated from the management server 3 and executes file update.

The first file acquiring unit 212 of the first wireless access network device 2 makes an inquiry as to the version (version number) in the first table information in the second storage unit 22 of the adjacent second wireless access network device 2 (step S602). This will reveal that the version in the first wireless access network device 2 is newer than the version in the second wireless access network device 2.

Thus, the second file acquiring unit 212 of the second wireless access network device 2 transmits a request signal for acquiring a load module to the first wireless access network device 2 (step S603).

In response to the request signal from the second wireless access network device 2, the first wireless access network device 2 transmits a load module to the second file acquiring unit 212 of the second wireless access network device 2 (step S604).

The second controlling unit 21 of the second wireless access network device 2 updates the version of the load module therein with the use of the load module acquired from the first wireless access network device 2 (step S605).

Figure 7:
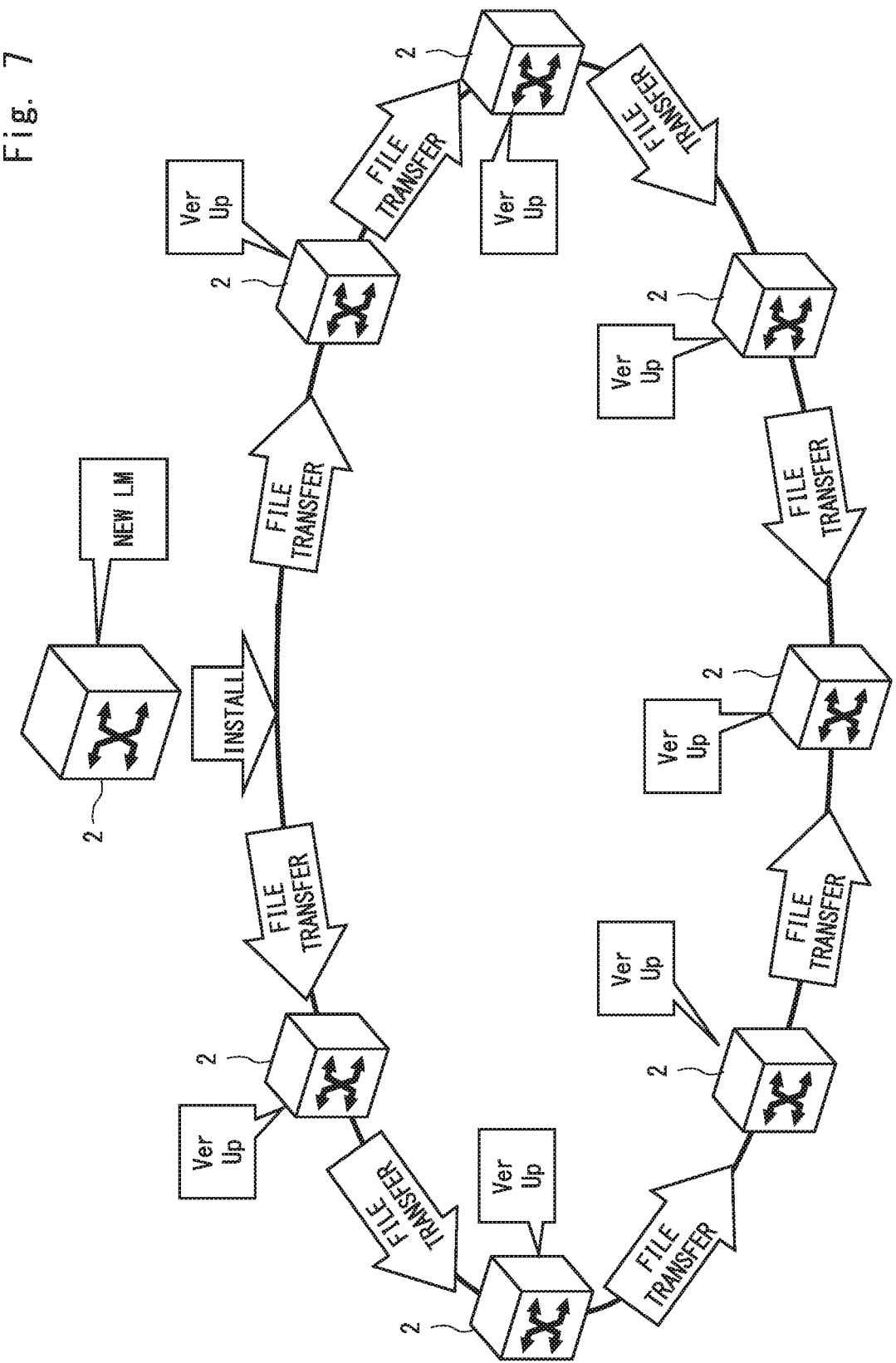
FIG. 7 illustrates a method of updating a version when a first wireless access network device with a load module of a new version mounted therein is installed in a network.

FIG. 7 illustrates a method of updating a version when the first wireless access network device 2 with a load module of a new version mounted therein is installed in a network. A wireless access network device 2 adjacent to the first wireless access network device 2 updates the version of a load module in accordance with the sequence illustrated in FIG. 6 described above. Then, through the repeated file exchange with adjacent wireless access network devices 2, each wireless access network device 2 updates the version of the load module successively. Consequently, all the wireless access network devices 2 within the network have their load modules updated to the latest version.

Thus, a wireless access network device 2 according to the present example embodiment includes a controlling unit 21 that controls communication and a storage unit 22 that stores first table information that includes version information of each object. The controlling unit 21 includes a difference detecting unit 211 and a file acquiring unit 212. The difference detecting unit 211 compares the first table information in the storage unit 22 and second table information that is stored in a load module and that includes version information of each object and detects a difference between the first table information and the second table information. The file acquiring unit 212 acquires an update file for an object that is to have its version updated from another adjacent wireless access network device 2 when the difference detecting unit 211 has detected a difference.

This makes it possible to update not only the version of the load module in the wireless access network device 2 but also the version of each object. Furthermore, the versions can be updated not only within each wireless access network device 2 but also between the wireless access network devices 2. This can greatly reduce the work and cost of version management.

In the present disclosure, for example, the process illustrated in FIG. 3 can also be implemented by causing a CPU to execute a computer program.

The program can be stored and supplied to a computer with the use of various types of non-transitory computer-readable media. The non-transitory computer-readable media include various types of tangible storage media. Examples of the non-transitory computer-readable media include magnetic storage media (e.g., flexible disk, magnetic tape, hard disk drive), optical magnetic storage media (e.g., magneto-optical disk), CD-ROM, CD-R, CD-R/W, and semiconductor memories (e.g., mask ROM, programmable ROM (PROM), erasable PROM (EPROM), flash ROM, random-access memory (RAM)).

The program may be supplied to a computer in the form of various types of transitory computer-readable media. Examples of the transitory computer-readable media include an electric signal, an optical signal, and an electromagnetic wave. The transitory computer-readable media can supply the program to a computer via a wired communication line, such as an electric wire or an optical fiber, or via a wireless communication line.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A version management system comprising:
   a plurality of interconnected wireless access network devices, each wireless access network device comprising:
   at least one memory configured to store instructions, and
   at least one processor configured to execute instructions to:
   control communication and store first table information that includes version information of a plurality of objects,
   compare the first table information with second table information that is stored in a load module for detecting a difference between the first table information and the second table information, the second table information including the version information of each of the plurality of objects that is to have its version updated, and
   acquire an update file for a first object of the plurality of objects that is to have its version updated from an adjacent wireless access network device when the difference has been detected, and
   the version management system further comprises a management server configured to manage the wireless access network devices and to instruct the wireless access network devices to perform the version updating, wherein the wireless access network devices update a version of at least one of the load module and the plurality of objects by repeating a file exchange with the adjacent wireless access network device, the wireless access network devices update the version of the load module in response to an update instruction from the management server, and the at least one processor for each of the wireless access network devices is further configured to check the version in the first table information in the adjacent wireless access network device, and in response to determining that the version in the wireless access network device that checked is newer than the version in the adjacent wireless access network device, the adjacent wireless access network device acquires the load module from the wireless access network device that checked the version.

2. The version management system according to claim 1, wherein the plurality of objects is are read-only memory (ROM) data of a field-programmable gate array (FPGA}, a load module (LM) for a sub-CPU mounted on an interface (IF) card, or embedded software (ESW) in an outdoor unit (ODU).

3. A version management method for a version management system comprising: a plurality of interconnected wireless access network devices, each wireless access network device includes at least one memory configured to store instructions, and at least one processor configured to execute instructions to:

control communication and store first table information that includes version information of a plurality of objects, and a management server configured to manage the wireless access network devices and to instruct the wireless access network devices to perform version updating, the version management method comprising:

comparing the first table information with second table information that is stored in a load module and detecting a difference between the first table information and the second table information, the second table information including the version information of each of the plurality of objects that is to have its version updated; and acquiring an update file for a first object of the plurality of objects that is to have its version updated from an adjacent wireless access network device in response to detecting the difference, wherein the wireless access network devices update a version of at least one of the load module and the plurality of objects by repeating a file exchange with the adjacent wireless access network device, the wireless access network devices update the version of the load module in response to an update instruction from the management server, the wireless access network devices check the version in the first table information of the adjacent wireless access network device, and in response to determining that the version in the wireless access network device that checked is newer than the version in the adjacent wireless access network device, the adjacent wireless access network device acquires the load module from the wireless access network device that checked the version.

4. A non-transitory computer-readable medium storing a program for a version management system comprising: a plurality of interconnected wireless access network devices, each wireless access network device includes at least one memory configured to store instructions, and at least one processor configured to execute instructions to control communication and store first table information that includes version information of each of a plurality of objects, and a management server configured to manage the wireless access network devices and to instruct the wireless access network devices to perform version updating, the program causing a computer to:

compare the first table information with second table information that is stored in a load module and detecting a difference between the first table information and the second table information, the second table information including the version information of each of the plurality of objects that is to have its version updated; and acquire an update file for a first object of the plurality of objects that is to have its version updated from an adjacent wireless access network device in response to detecting the difference wherein the wireless access network devices update a version of at least one of the load module and the plurality of objects by repeating a file exchange with an adjacent one of the wireless access network devices, the wireless access network devices update the version of the load module in response to an update instruction from the management server, the wireless access network devices check the version in the first table information of the adjacent wireless access network device, and in response to determining that the version in the wireless access network device that checked is newer than the version in the adjacent wireless access network device, the adjacent wireless access network device acquires the load module from the wireless access network device that checked the version.

* * * * *